Patented July 30, 1940

2,209,769

UNITED STATES PATENT OFFICE 2,209,769

GERMICIDE

William H. Engels and John Weijlard, Rahway, N. J., assignors to Merck & Co. Inc., Rahway, N. J., a corporation of New Jersey No Drawing. Application April 9, 1935, Serial No. 15,426

7 Claims. (Cl. 167—53.2)

Because of the well-known insecticidal properties of rotenone, one of the active constituents of *Derris elliptica* and of certain South American plants, it has been suggested for use in treating diseases of the type under discussion. It has been shown by the work of Sonkichi Takei, U. S. Patent #1,724,626, that rotenone, as such, or as present in derris extract is itself unstable in the presence of water and alkali, which accounts for the instability and unsatisfactory character of ordinary preparations made up, for instance, with industrial alcohol and soap powders.

The direct use of solutions of rotenone in absolute alcohol, acetone, or other similar volatile organic solvents, in which this principle is fully soluble, are nevertheless ineffective for the purpose under consideration because when such a solution is applied, the warmth of the animal's body causes the solvent to evaporate rapidly, leaving the rotenone on the surface of the affected parts. The medicament is thus prevented from reaching the parasitic organisms which thrive in the skin at the roots of the hair.

We have now found it possible to produce satisfactory preparations utilizing pure rotenone itself, or extracts of rotenone-bearing plants (such as *Derris elliptica* and barbasco or barbasco cube) which overcome these objections, by dissolving the remedial agent in suitable solvents of the type mentioned above, and then combining them with emollient and skin-penetrating carrying agents.

This invention relates to certain preparations for the treatment of parasitic skin diseases, and more particularly for the treatment of such diseases in animals.

Animals, and especially dogs, are peculiarly susceptible to the disease commonly known as "red mange," a disease resulting from the invasion of the hair follicles by the parasite *Demodex folliculorum*. For the treatment of this disease, many remedies have been advanced. However, none of these has been entirely satisfactory, chiefly because the agencies employed act too slowly or because the forms in which they are administered are not sufficiently penetrating to combat the ravages of the parasite.

Such preparations are made by first dissolving the rotenone or extract in relatively non-irritating volatile solvents such as acetone, benzene, absolute alcohol, chloroform, etc., and admixing the solutions thus obtained with vegetable or animal fatty oils, such as olive oil, peanut oil, neat's-foot oil, etc., or with fats of the type of anhydrous wool fat for the preparation of the remedy in ointment form.

*Derris elliptica* mentioned herein is a rotenone-bearing plant which is principally found in Asia. The broad disclosure herein made of the plants generally described as barbasco or barbasco cube is intended to cover a great variety of rotenone-bearing plants of this general type which are found principally in Central or South America.

It has been considered, as pointed out by Takei, (supra), that rotenone itself is generally unsuitable for use, as such, due to its toxicity and instability when used in the old forms and, therefore, the preferred employment of the active principle has been preferably restricted to use in the form of extracts of the derris species.

We have now found that in our new method of preparing these products we can utilize pure rotenone itself as well as rotenone-containing plant extracts, such as derris extract, with equal advantage. Obviously, the use of pure rotenone, per se, has the advantage of more definite quantitative control and dosage, although the other preparations may be economically preferable.

In preparing an effective stabilized product containing rotenone, in accordance with this invention, we employ non-aqueous volatile solvents which are non-toxic when used externally, and which very readily and thoroughly dissolve the medicament. The volatile pre-solvents selected are also soluble in animal or vegetable fatty oils or fats, and serve as preservatives for the oil solutions which are subsequently prepared. The pre-solution in the volatile solvents and the subsequent solution in fatty oils or fats produce compounds which, when applied to diseased surfaces, lend themselves to even distribution of the medicament over the affected areas. Furthermore, these oils or fats, in addition to their function as stabilizing carriers, serve also as emollients and thus tend to counteract any irritating or drying effects of the volatile solvents upon the skin of the animal being treated, and, because of their affinity to skin tissue, penetrate it deeply and thus carry the active principle to the diseased tissue in sufficiently effective quantities for the purpose of attacking and destroying the parasites.

Rotenone in the form of derris extract has hitherto been employed as an insecticide (largely for agricultural purposes) generally in the form of a dry dusting powder or extemporaneously prepared solutions.

Owing to the recognized instability of the material, it has not usually marketed in the form of prepared stock solutions and preparations. The product of the present invention, on the other hand, is made up ready for use, requiring, perhaps, if so desired, only dilution with the same or similar fatty oils or fats for the purpose of reducing the strength of the preparation as marketed.

An oil solution or ointment as described, containing as little as ½ of 1% or as much as 2% or even more pure rotenone (or derris or other rotenone-bearing extract), may be uniformly applied to the affected areas by any appropriate means without toxic effect, and has been found to exert beneficial action on the diseased areas in a relatively short time, as is usually evidence by early cessation of the severe itching which is one of the characteristics of the disease, and by an abundant growth of new fur.

In cases where the disease has progressed to an advanced stage and secondary infection by bacteria has set in, it will often be avisable to add also an oil-soluble germicide of the class of cresols, xylenols, and other phenol homologs, with or without halogen groups in the molecule such as thymol, chlorthymol, dichlorhexylphenol etc. Such adjuvant substances may be added to our stabilized rotenone compounds without danger of impairing the parasiticidal properties of the rotenone or derris component.

The products described herein may be prepared by the following methods:

(1) One pound of derris extract is dissolved in 10 pints of acetone, and to this solution is added 90 pints of olive oil; (2) To a solution of ½ lb. pure rotenone in 5 pints benzene, are added 95 pints of peanut oil; (3) One-half lb. of derris extract is dissolved in 5 pints of chloroform and the solution added to 95 pints of peanut oil; (4) Two pounds of derris extract and one pound chlorthymol are dissolved in 5 pints of chloroform and the solution added to 95 pounds of anhydrous wool fat; one pound of rotenone is added to about ten pints of chloroform and the solution added to about 90 pints of olive oil; one pound of crude derris extract is added to ten pints of acetone, and the solution added to ninety pints of peanut oil; a half pound of pure rotenone is dissolved in five pints of absolute alcohol, and the solution added to ninety-five pints of olive oil and one pound of chlorothymol.

It is believed that the general scope of the invention will be completely understood by a consideration of the objectives as previously set forth, and the methods of preparation exemplified above. It is to be understood, of course, that these methods are given by way of illustration only and that they represent materials which may be prepared by pre-solution of the active principle in solvents comprising preferably volatile liquids of the type described and subsequent solution in a wide range of bland animal or vegetable fatty oils or fats.

In general, it is desirable that the amount of non-aqueous solvent employed for predissolving and dispersing the rotenone, respectively, rotenone-bearing extract in the emollient oil or fat employed as stable carrying agent, should be held to a relatively small quantity, yet sufficient to completely dissolve the amount of rotenone to be incorporated.

We claim as our invention:

1. A composition of matter comprising a substance selected from the group consisting of rotenone and rotenone-bearing extracts, a substance selected from the group consisting of emollient vegetable and animal fats and oils, and a non-toxic, non-aqueous volatile solvent the rotenone being present in sufficient quantity to effectively destroy Demodex folliculorum, and the volatile solvent, being present in a quantity sufficient to dissolve the rotenone and stabilize the mixture, but insufficient to harmfully effect the skin of a hirsute animal.

2. A stabilized rotenone preparation for the treatment of parasitic skin diseases which comprises a rotenone-bearing plant extract, a non-toxic, non-aqueous, volatile solvent, and a substance selected from the group consisting of emollient animal and vegetable fatty oils and fats, said rotenone being present in sufficient quantity that upon repeated application it effectively destroys the germ Demodex folliculorum and said volatile solvent being present in a quantity sufficient to dissolve the rotenone and stabilize the mixture, but insufficient to harmfully effect the skin of a hirsute anim.l.

3. A preparation for the treatment of parasitic skin diseases which consists of rotenone, a substance selected from the group consisting of emollient animal and vegetable oils and fats, and a non-toxic, non-aqueous volatile solvent present in a quantity sufficient to dissolve the rotenone and stabilize the mixture, but insufficient to harmfully effect the skin of a hirsute animal.

4. A preparation for the treatment of parasitic skin diseases which consists of barbasco extract, a substance selected from the group consisting of emollient animal and vegetable oils and fats, and a non-toxic, non-aqueous volatile solvent present in a quantity sufficient to dissolve the barbasco extract and stabilize the mixture but insufficient to harmfully effect the skin of a hirsute animal.

5. A stable solution comprising one pound of pure rotenone, 10 pints of cholorform and 90 pints of olive oil.

6. A stable solution comprising one pound of crude derris extract, 10 pints of acetone, and 90 pins of peanut oil.

7. A stable solution comprising ½ pound of pure rotenone, 5 pints of absolute alcohol, 95 pints of olive oil and a pound of chlorthymol.

WILLIAM H. ENGELS.
JOHN WEIJLARD.